United States Patent
Bossom et al.

(10) Patent No.: US 7,788,648 B2
(45) Date of Patent: Aug. 31, 2010

(54) SYSTEM AND METHOD FOR THE LOCALIZATION OF RELEASED COMPUTER PROGRAM

(75) Inventors: John Bossom, Dunrobin (CA); Eric McCully, Gloucester (CA); Dekun Cao, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 11/067,826

(22) Filed: Feb. 28, 2005

(65) Prior Publication Data

US 2006/0195831 A1  Aug. 31, 2006

(51) Int. Cl.
*G06F 9/45* (2006.01)
*G06F 9/445* (2006.01)
*G06F 17/20* (2006.01)

(52) U.S. Cl. ............... 717/136; 717/169; 717/175; 704/8

(58) Field of Classification Search ............ None
See application file for complete search history.

(56) References Cited

U.S. PATENT DOCUMENTS

| | | | | |
|---|---|---|---|---|
| 5,664,206 | A * | 9/1997 | Murow et al. ............ | 704/8 |
| 6,035,121 | A * | 3/2000 | Chiu et al. ............... | 717/141 |
| 7,568,196 | B2 * | 7/2009 | Krebs ...................... | 718/100 |
| 2003/0126559 | A1 * | 7/2003 | Fuhrmann ............... | 715/513 |
| 2003/0134401 | A1 * | 7/2003 | Wandrey et al. ......... | 435/142 |
| 2006/0117304 | A1 * | 6/2006 | Anastassopoulos et al. | 717/136 |
| 2007/0169035 | A1 * | 7/2007 | Seidenbecher .......... | 717/141 |

OTHER PUBLICATIONS

Extensible Markup Language (XML) 1.0, 3rd, W3C Recommendation Feb. 4, 2004, section 2.2 Characters, 5 pages.*

* cited by examiner

*Primary Examiner*—Tuan Q Dam
*Assistant Examiner*—Zheng Wei
(74) *Attorney, Agent, or Firm*—Shumaker & Sieffert, P.A.

(57) ABSTRACT

A system and a method for localization of a base language computer software product into a target language computer software product. Input resource files were copied into a source directory, and synchronized with a reference directory and a synchronization directory; the resource strings to be translated in the resource files in the synchronization directory are flagged, and translated; the changes are tracked in the reference directory.

15 Claims, 8 Drawing Sheets

SYSTEM AND METHOD FOR THE LOCALIZATION OF RELEASED COMPUTER PROGRAM

FIELD OF THE INVENTION

The present invention relates generally to the development of computer software. In particular, the present invention relates to the development of multi-language computer software.

BACKGROUND OF THE INVENTION

As computers have become more prevalent, many computer programs are now distributed throughout the world to geographic regions having a wide range of languages and other geographic differences. Thus, it has become desirable for software developers to be able to market their products to those people who do not speak the native language of the software developers. In particular, it is beneficial that software developed in a base language, for example in English, be available for individual geographic and linguistic regions, a process known as localization. In addition, when a software product is marketed to a bilingual country such as Canada, national and local laws may dictate that computer software must be presented in the official languages of that country.

The process of localizing computer software largely involves translating exposed resource strings in base language, such as text message, menu, and button, into a target language. Resource strings are series of characters manipulated as a group, and are used to display text and other characters through a graphical user interface (GUI) generated on a computer display. The process of localizing computer software is time-consuming and expensive. The resource strings must be translated to allow the user to operate the program. The most direct way to do this is to search the entire program source code for every resource string, and translating each of these to the target language, with the translated resource strings subsequently compiled into runtime files for individual operating system platforms. This development method ensures that a relatively stable base version of the code is available for the internationalization and localization processes.

This approach has several problems. One problem is that the use of this method means that the software must be specifically translated and compiled for each intended language. This, of course, is an expensive process in itself, and means that any change in the source code requires each language version of the code to be edited and recompiled. The compiled runtime files are then placed into their required locations within a file structure to be called when needed. Another limitation is that since a resource library file is generated at build time on a particular operating system platform, it is limited to use on that one platform. Yet another problem is that the sale and distribution of the additional target language versions of the software is delayed.

More significantly, obstacles are created in terms of future upgrades for the software via periodic maintenance releases. Software defects in the base code, when discovered and subsequently repaired during the internationalization and localization processes, will result various target language versions of the product produced via a traditional software development method ultimately differ from the originally released base language version.

These differences increase as the software developer seeks to prepare and distribute periodic maintenance releases of the product to upgrade its customer's software and to correct deficiencies often discovered through the customer's use of the product. Where multiple customers have a variety of base and target language versions of the same software, the time and costs associated with the preparation and delivery of a maintenance release are significantly increased because the base from which changes are to be implemented is not uniform.

In addition, customers of the base language version of the software product also typically discover defects. As these defects are corrected by the software developer before the internationalization and localization processes, the corrections are typically incorporated into the subsequent target language versions, compounding complexity of the changes which must be implemented in order to correct the defects discovered during internationalization and localization, thereby creating the potential for further delay in the delivery of the target language versions of the computer software.

One localization method for instruction manuals, books, and computer programs containing words, phrases, sentences, and paragraphs appropriate to the native language of a user, is described as creating a spreadsheet which contains one or more words in the base language, and correlates those base language components with corresponding components of other target languages. This method presents a problem in that the translation is performed on text isolated in a separate file, without any kind of context. The translation will therefore often contain errors which would not be present if the translation had been performed according to the context in which the text appears.

Another described method creates a localized version of a target computer software by first loading a localization kit, creating a binary version of the localized materials, and then overlay this binary version of the localized materials onto a binary version of the target computer program product to produce a localized target computer program. This method requires additional software in the form of a localization kit. It also has to be run for all resource strings of the base language version. When the binary version of the localized materials are laid onto a binary version of the target computer program product language modules, the target computer program would have to be stopped, perhaps uninstalled and re-installed. This necessitates periods of time when the computer program is not available.

Another method for providing language translators with contextual information for the to be translated target text has also be described. The translator is presented with a graphical user interface in the base language, can then interactively translate each text label on the screen. The ability to edit the text within the application is achieved by adding an editor function to the software application itself. Each text label in the application is stored in a localization file with a specific resource bundle name and by a key. When the editor is activated, the text object is introspected for its source data, and the translator can edit the text directly. This method has the disadvantages that a translator is required, in addition to the extra function of the editor in the computer software product.

Therefore, there is a need for a method and system to separate the localization from the software development process. Furthermore, there is a need to compile and generate the runtime files after release of the base software. What is also needed is a process for localizing computer software to reuse the previous translation in a more cost-effective, efficient and standardized manner.

SUMMARY OF THE INVENTION

According to one aspect of the present invention there is provided a method for localizing a base language file for a computer software product. The method has the steps of: designating a source directory having input resource files; synchronizing the source directory, a reference directory and a synchronization directory; flagging the resource strings to be translated in the resource files in the synchronization directory; translating the flagged resource strings in the synchronization directory; and tracking changes in the reference directory. According to another aspect of the present invention there is provided a computer readable medium storing instructions or statements for use in the execution in a computer of a method for localizing a base language file, the method comprising steps of: designating a source directory having input resource files; synchronizing the source directory, a reference directory and a synchronization directory; flagging the resource strings to be translated in the resource files in the synchronization directory;

translating the flagged resource strings in the synchronization directory; and tracking changes in the reference directory.

BRIEF DESCRIPTION OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein.

DETAILED DESCRIPTION OF THE PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Reference throughout the specification to "one embodiment" or "an embodiment" a means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
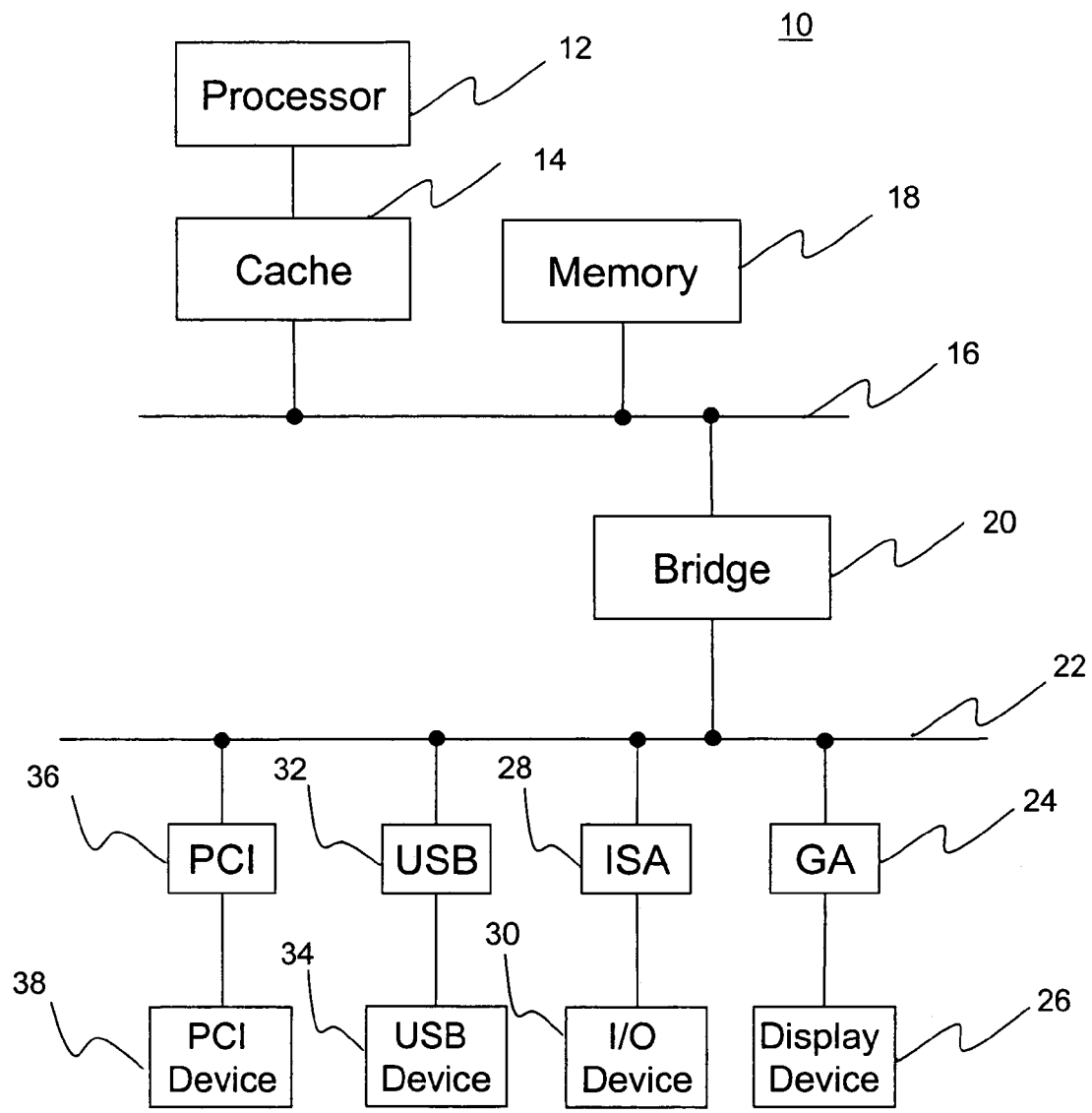
FIG. 1 depicts a system in which a preferred embodiment of the present invention may be implemented.

Referring to FIG. 1, a block diagram of a system in which a preferred embodiment of the present invention may be implemented is illustrated. The system (10) may be, for example, one of the general purpose computers. The system (10) includes processor (12), which in the exemplary embodiment are each connected cache memory (14), the cache (14) is connected in turn to a system bus (16).

Also connected to system bus (16) are a system memory (18) and a host bridge (20). Host bridge (20) I/O bus (22) to system bus (16), relaying and/or transforming data transactions from one bus to the other. In the exemplary embodiment, the system (10) includes graphics adapter (24) connected to I/O bus (22), receiving user interface information for display device (26). Peripheral devices such as universal serial bus devices (34), and input/output (I/O) device (30), which may include a conventional mouse, a key board, or the like, are connected via an Industry Standard Architecture (ISA) bridge (28), or a Universal Serial Bus (USB) bridge (32) to I/O bus (22), respectively. Host bridge (20) is also connected to PCI device (38) via PCI bridge (36).

The exemplary embodiment shown in FIG. 1 is provided solely for the purposes of explaining the invention and those skilled in the art will recognize that numerous variations are possible, both in form and function. For instance, the system (10) may also include a digital video disk (DVD) drive, and numerous other optional components. All such variations are believed to be within the spirit and scope of the present invention. The system (10) and the exemplary figures below are provided solely as examples for the purposes of explanation and are not intended to imply architectural limitations. In fact, this method and system can be easily adapted for use on any programmable computer system, or network of systems, on which software applications can be executed.

The term "internationalization" is intended to include any method for designing and coding a software product so that it can be made to function for international use, or the like. A product is internationalized if a target language version is created and does not interfere with the current or planned national language support of other products; or with the current base language version.

The term "file" is intended to include any collection of information stored under one name on a disk.

The term "base language" is intended to include the language, or a variant thereof, which are used to develop the computer software product, for example: English.

The term "target language" is intended to include the language other than the base language, for which a market demand exists for the computer software product. Examples include, but are not limited to: German; Spanish; French; Japanese; Danish; Dutch; Italian; Portuguese; Swedish; Chinese; Korean; Czech; Finnish; Greek; Hebrew.

The term "target language version" is intended to include a variant of a base language product that is targeted to a particular market.

The term "localization" is intended to describe the translating and adding process to adapt a base language product to accommodate target languages, conventions, and cultures.

The term "resource strings" is intended to include a series of characters manipulated as a group, and are used to display text and other characters, non-limiting examples include text message, menu, and button. Resource strings may be displayed on a graphical user interface (GUI) or written to a file or a database.

The term "input resource files" is intended to include files that contain message strings, such as error messages and warnings, as well as menu text and user interface text, or the like. Input resource files can be, for example, XML files.

Figure 2:
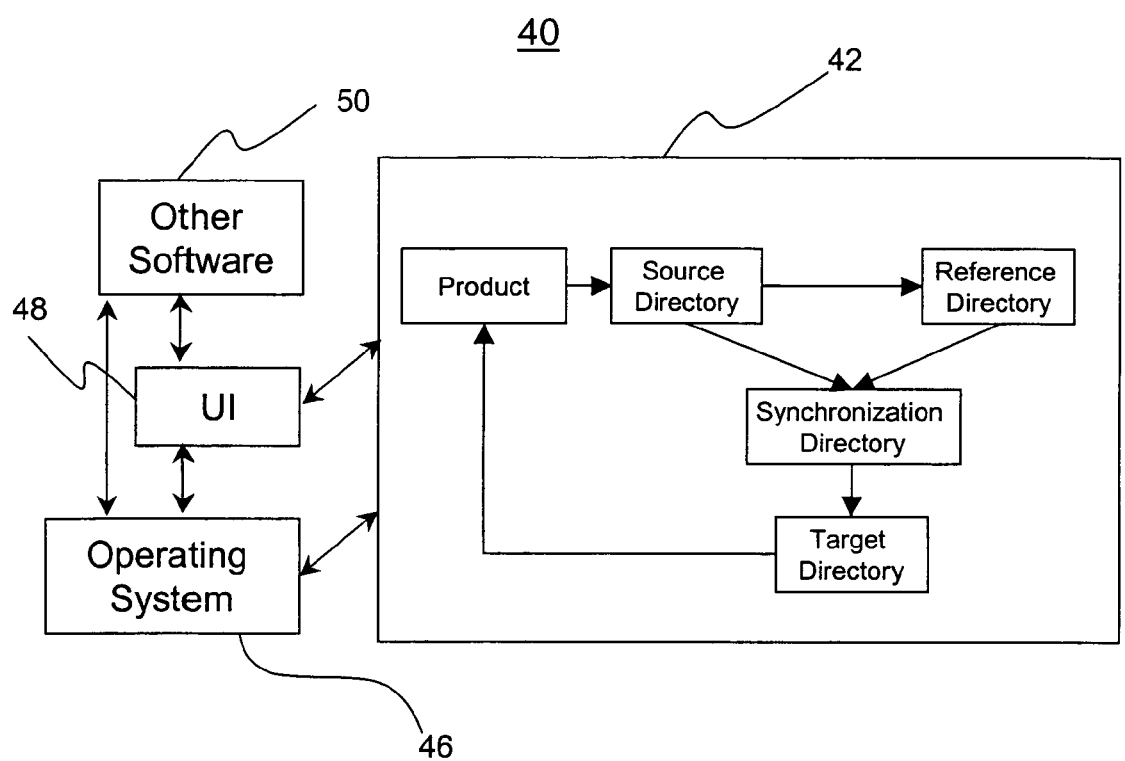
FIG. 2 depicts a software system in which a preferred embodiment of the present invention may be implemented.

Referring to FIG. 2, a computer software system (40), wherein the present invention can be implemented, is provided for programming the operation of the computer system (10). Software system (40), which is stored in system memory (18) and on disk memory, includes an operating system (46). Operating system (46) is the executive or supervisor for the system (10), directing both task management and data management. Localization process (42) stores, retrieves, and manipulates information in directories.

As illustrated in FIGS. 1 to 2, the system (10) and software system (40) are used for localization of software products.

Figure 3:
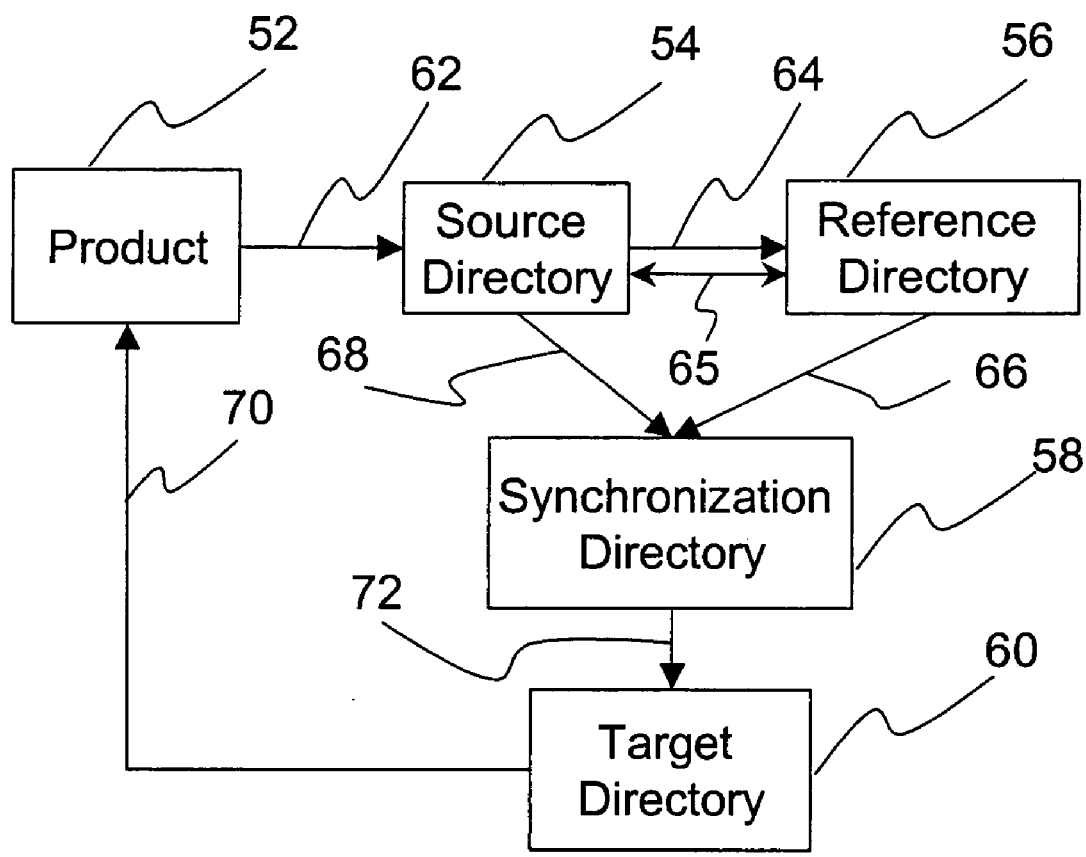
FIG. 3 illustrates an embodiment of the present invention for localization of base language computer software.

Referring to FIG. 3, according to one embodiment of the present invention, all input resource files from the software product's installation reside in a source directory (54), and may be copied into another designated source directory. The source directory (54) contains the original input resource files with resource strings copied from the software product (52). The base language, such as English, may be specified in the name of the files. The source directory may further comprise processing instructions for localization. The processing instructions may provide information on, for example, the format of the files to be generated. The processing instructions may further provide the sub-directory tree structure required by the released product, which is used to determine the location for the generated output during generation. These processing instructions are used both during the synchronization and generation process. A reference directory (56) contains copies of the latest input resource files in base language after synchronization. The reference files will be used during the next localization project to determine which messages were added or updated. The target language may be specified in the name of the files. A synchronization directory (58) contains the resource files that are used to localize the resource strings. In subsequent versions of the product, new messages are added, obsolete messages are deleted, and updated messages are flagged. The source directory (54), the reference directory (56) and the synchronization directory (58) are synchronized (64, 65, 66, 68). Files in reference directory (56) are used to keep track of changes for the localization of the subsequent versions of the computer software product. Files in the synchronization directory (58) are the files to be translated. All the resource strings to be translated are flagged in files in synchronization directory. The resource strings flagged in the synchronization directory are then translated and validated. A target directory (60) contains the generated output in a format required by the product, for example but not limited to binary, Java properties, and other formats. Runtime files are then generated (72) into the directory structure required by the software product (52), to the target directory (60). To use the localized runtime files, the generated output can be copied back to where the product is installed (70), if the localized runtime files are located in the target directory (60). To localize the next release of the computer software product, the files in the source directory (54), the reference directory (56) and synchronization directory (56) will be synchronized, and the new and changed resource strings since previous release will be flagged. Only these flagged resource strings then need to be translated, helping to reduce the cost of translation significantly.

Figure 4:
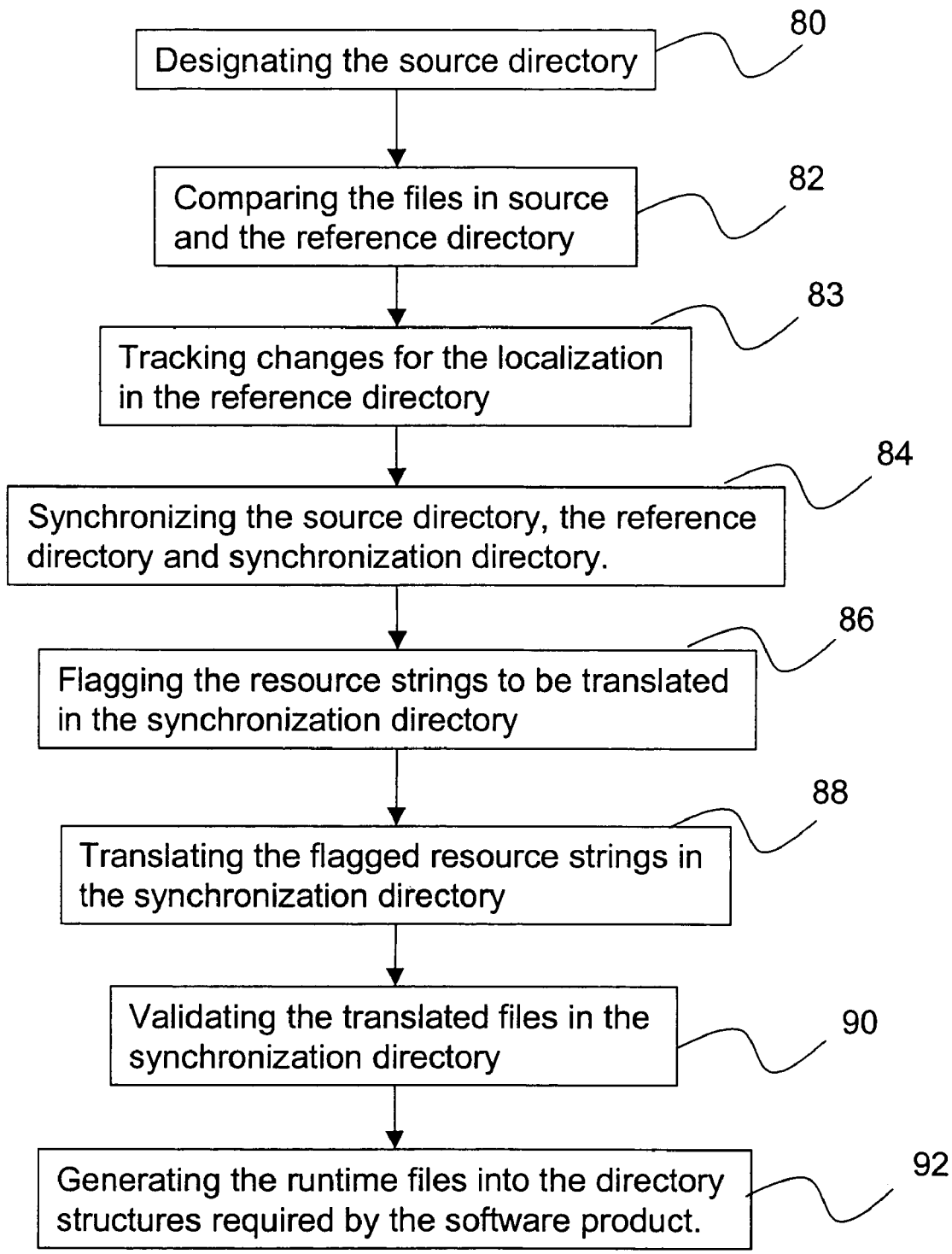
FIG. 4 illustrates steps of an embodiment of the present invention for localization of base language computer software.

FIG. 4 illustrates the steps of one embodiment of the present invention. At (80) all input resource files from the product's installation reside in a source directory (54), and may be copied into another designated source directory; at (82) the files in the source directory and the reference directory are compared; files in reference directory are used to keep track of changes for the localization of the subsequent version of the same product (83); the source directory, the reference directory and synchronization directory are then synchronized (84). Files in synchronization directory are the files to be translated. All the resource strings to be translated are flagged in files in synchronization directory (86); at next step (88) the resource strings flagged in the above step in the synchronization directory are translated; at next step (90) the files are validated in the synchronization directory; at (92) the runtime files are generated into the directory structures required by the software product.

Figure 5:
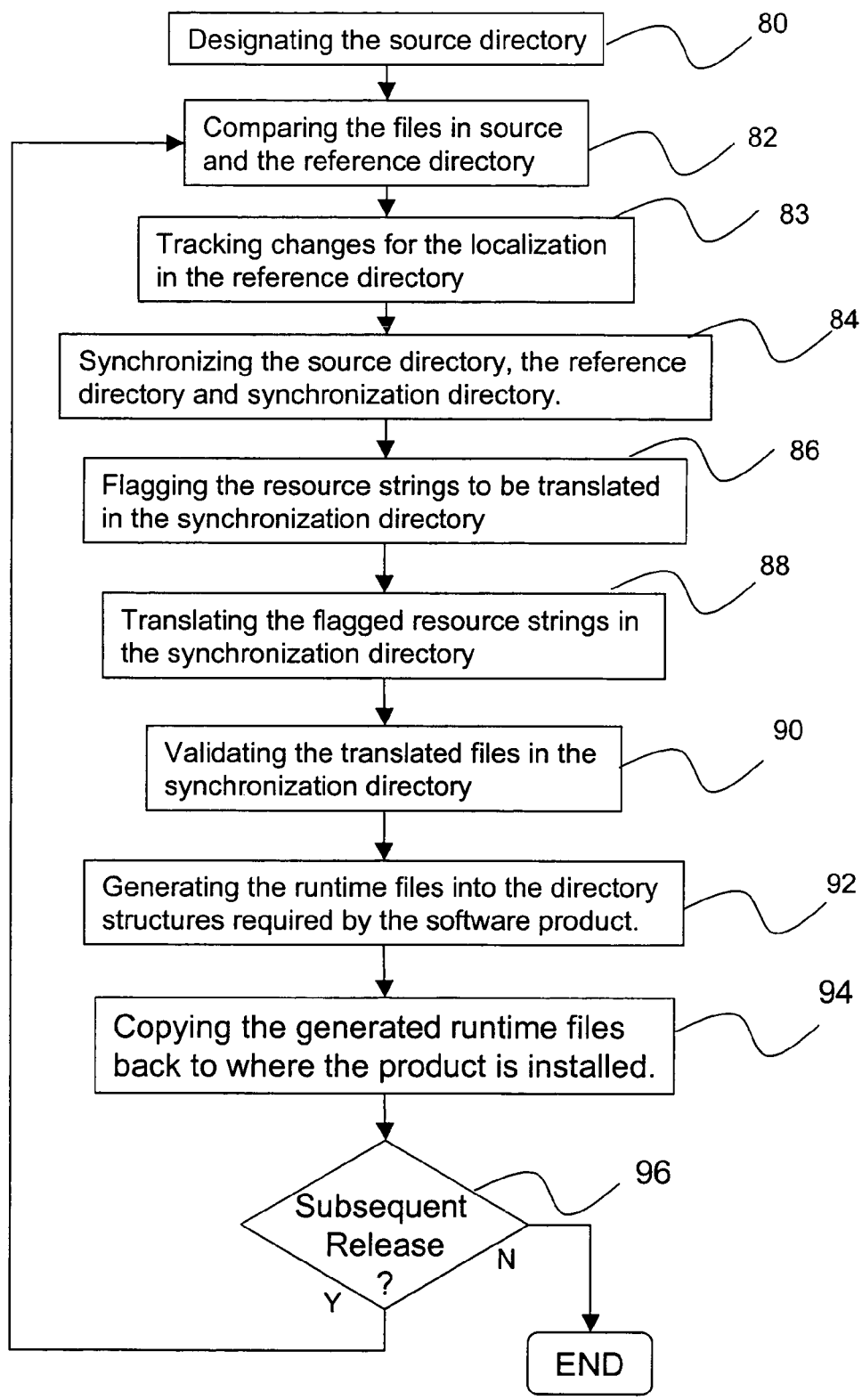
FIG. 5 illustrates additional steps of an embodiment of the present invention for localization of base language computer software.

Referring to FIG. 5, the present invention may further have two additional steps: to use the localized runtime files, the generated output is copied back to where the product is installed (94); and for localizing the next release of the same product (96), the invention synchronizes the files in the source directory, the reference directory and synchronization directory, and flags the new and changed resource strings since previous release. Only these flagged resource strings then need to be translated, helping to reduce the cost of translation significantly.

Figure 6:
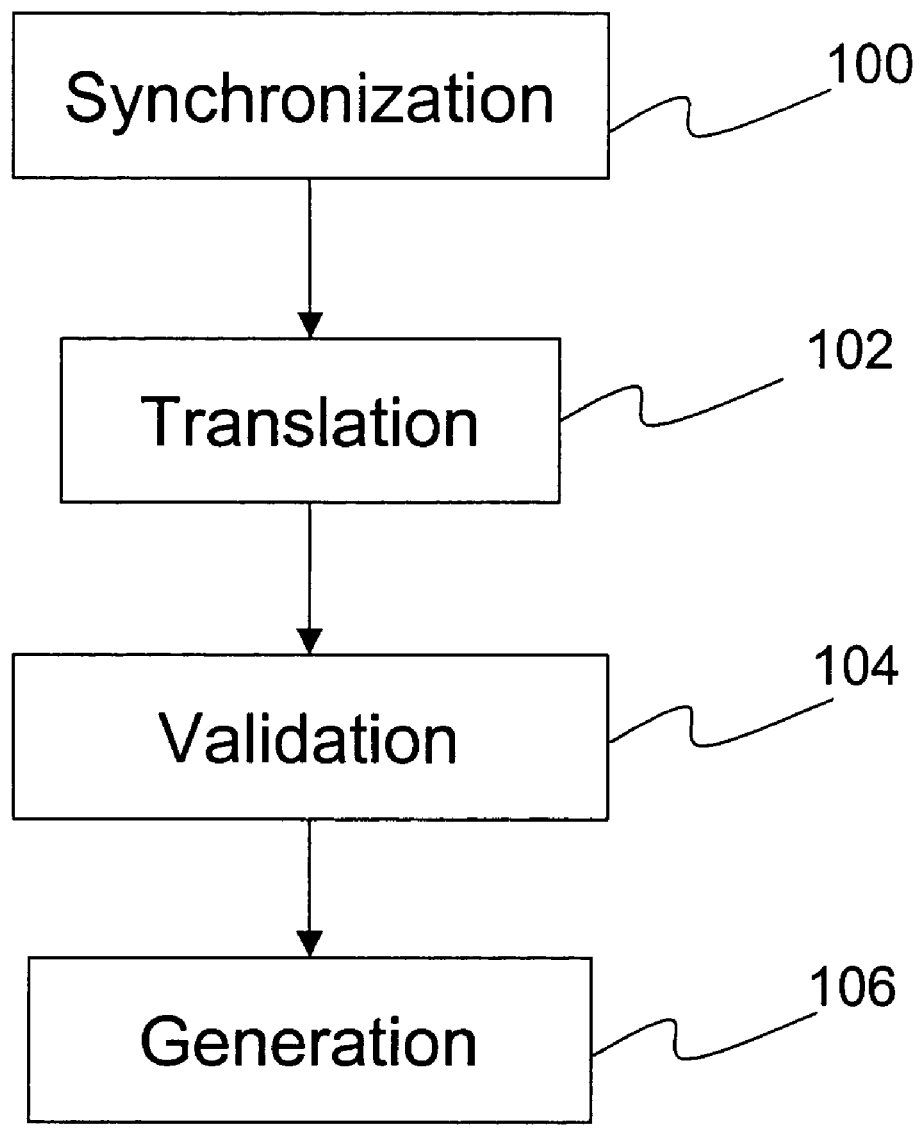
FIG. 6 illustrates exemplary steps of an embodiment of the present invention for localization of base language computer software.

Fig. 6 describes the four steps of the localization process: Synchronization (100) to create or update a set of resource files, and indicate messages to be translated. The messages resource files could be, for example, XML files; translation (102) to translate the message files created from above to the locale of interest validation (104), for example but not limited to, UTF8 encoding in some XML message files is validated: XML message is validated against the schema and the existence of attribute "translate" is checked: Generation (106) to generate the final message files, to place the target message files into required directory structure, and optionally to package the generated message files.

Variables used in embodiments of the present invention may include:

Variable Source_Directory specifies the location of the directory that will contain copies of the original resource files, for example, C:\Translation\src in Windows.

Variable Source_Locale specifies the language code of the original resource files from which the resource strings is localized such as en; fr, de; ja, for English, French, German, Japanese, respectively; with a default of en.

Variable Synchronization_Directory specifies the location of the directory that will contain the resource files that the user translates or modifies, for example, C:\Translation\Sync.

Variable Reference_Directory specifies the location of the directory that will contain unchanged copies of the original resource files used in a given localization project. In a subsequent localization project, these files are used to determine which resource strings were added, deleted, or updated. The user can create this directory as a subdirectory of the synchronization directory, for example, C:\Translation\Sync\Ref.

Variable Sandbox_Directory specifies the location of the directory that will act as temporary workspace for the system, for example, C:\Translation\Sandbox.

Variable Target_Directory specifies the location of the directory that will contain the target resource files, for example, C:\Translation\Target.

Variable Target_Locale_List specifies one or more language codes, separated by a comma, into which the resource strings will be translated, for example, it. ru, pl, es, pt, and zh-cn.

Variable Package_File specifies the name and location of the compressed file (.zip) that will contain the packaged target resource files, for example, C:\Translation\LocalizationOut.zip.

Variable Log_File specifies name and location of the log file that will contain processing information, for example, C:\Translation\Localization.log.

Variable Component_Name_List specifies names of the product components, separated by a comma, that represent the component element in the input resource files for which the messages are localized.

Figure 7:
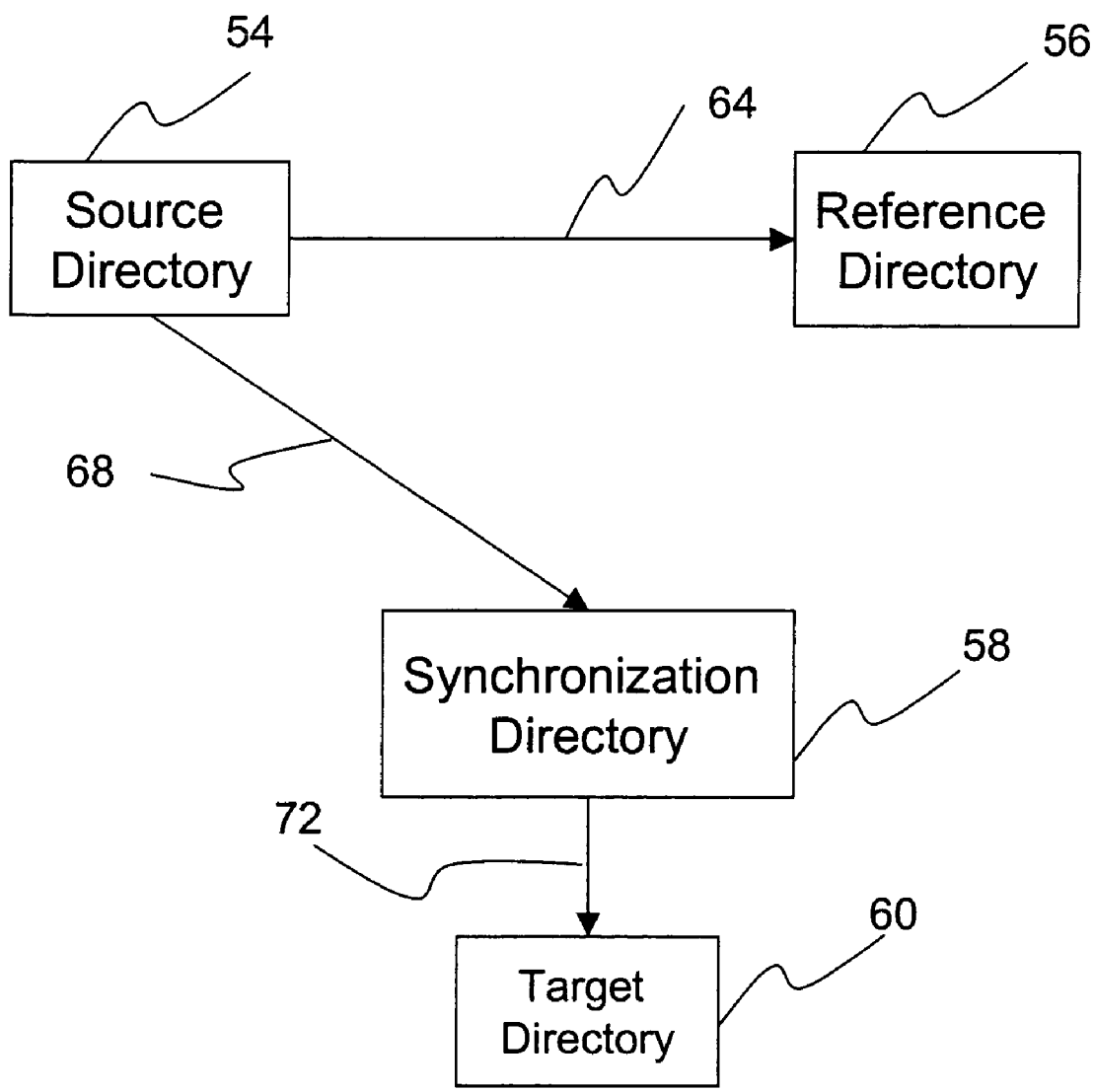
FIG. 7 shows steps of a first use of an embodiment of the present invention for localization of base language computer software.

FIG. 7 is another example of the localization method according to the present invention when used for the first time to translate the base language version to a target language version. The source directory (54) contains the original input resource files to be translated for the first time. For example, all the input resource files may be copied from the product's install location message file directory and subdirectories to the source directory. The source directory (54) may use the name specified for the Source_Directory variable during configuration.

Referring to FIGS. 6 and 7, the resource files are copied (68) to the synchronization directory (58). A translate attribute is added to the string elements in the resource files in the synchronization directory. The value of this attribute is set to new. At the same time the reference directory (56) is copied, updated (64) and contains copies of the latest input resource files. The synchronization directory (58) and the reference directory (56) may be automatically created in the location specified by the Synchronization_Directory and Reference_Directory variables during configuration. The synchronization directory (58) contains the resource files that are used to localize the resource strings. Files in reference directory (56) are used to keep track of changes for the localization of the subsequent versions of the computer software product. The file names in both synchronization and reference directories may include the target locale strings. For example, if fr, es are specified in the Target_Locale variables during configuration, the file names will contain these locale strings. Resource files in the reference directory are automatically renamed to include the _REF suffix in their name. For example, a file named CAM_AAA_es.xml becomes CAM_AAA_es_REF.xml.

The synchronization directory (58) is the translation directory. The files in the synchronization directory contain the resource strings to be localized. Files in the synchronization directory (58) are translated (102) or otherwise modified based on a translate attribute. Only files in the synchronization directory contain resource strings, for example, in messages and user interface text, with this attribute. The attribute "new" identifies all resource strings for the first localization project, and all new resource strings added after each subsequent localization project. The attribute "changed" identifies resource strings changed after the last localization project. Resource strings containing the translate attribute "new" or "changed" will be modified. Examples for files in the synchronization directory (58) are: CAM_AAA_es.xml to translate the resource strings to Spanish and CAM_AAA_it.xml to modify the resource strings in Italian. Once the resource strings are translated or localized, the translate attributes may be deleted globally.

The files in the reference directory (56) are used as a reference for subsequent localization projects, and are usually not for editing. For example, the synchronization directory (58) contains a file named CAM_AAA_fr.xrnl, and the reference directory (56) contains a file named CAM_AAA_fr_REF.xml. A file in the reference directory, for example CAM_AAA_fr_REF.xml may be a copy of the file from the source directory for the chosen base language, as in CAM_AAA_en.xml. Performing a subsequent iteration of the process entails comparing each input string from the new CAM_AAA_en.xml to that in the CAM_AAA_fr_REF.xml. if there is a difference, this string is copied from the base language file to the synchronization file and flagged as new or changed. The reference file is subsequently replaced with the corresponding file from the source directory. Here, the file CAM_AAA_fr.xml in the synchronization directory is used for translation.

Before generating the target resource files (106), the localized files in the synchronization directory are validated (104). The validation process checks to ensure that the localized files conform to a specified schema, and the translate attribute in the localized files is removed.

The target resource files containing the localized resource strings are generated (106). The target directory (60) may be created in the location specified in the Target_Directory variable. The structure of the target directory (60) may be identical to the structure of the product installation directory. The target directory (60) contains the generated output in a format required by the product.

Figure 8:
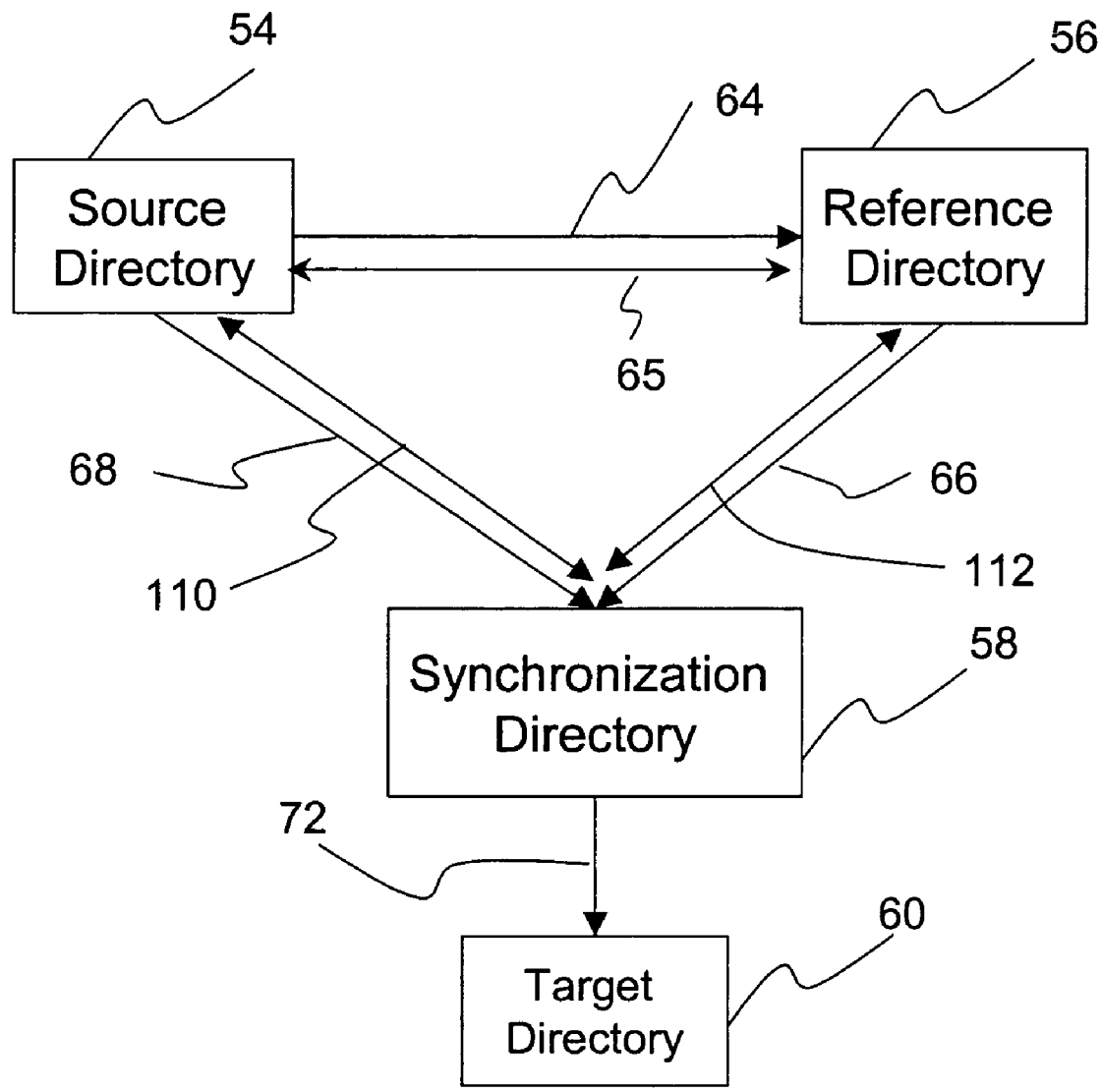
FIG. 8 shows steps of a subsequent use of an embodiment of the present invention for localization of base language computer software.

FIG. 8 describes an example where the localization process is used for subsequent release of a computer software product. The source directory (54), the reference directory (56) and the synchronization directory (58) are synchronized (65, 110, 112). The source directory (54) contains the input resource files to be translated after the first time localization. The resource files in the synchronization directory (58) are updated. At the same time the reference directory (56) is copied, updated (64) and contains copies of the latest input resource files for the chosen base language. One embodiment of the present invention permits a user to choose from which of the bundled languages to translate from, for example, those files in the source directory. Other input resource files shipped with the product may be ignored. The synchronization directory (58) contains the resource files that are used to localize the resource strings. Files in reference directory (56) are used to keep track of changes for the localization of the subsequent versions of the computer software product. Files in the synchronization directory (58) are then translated. The difference between the new version of files in the source directory (54)

and the previous version saved in the reference directory (56) are flagged in files in synchronization directory (58). The files in synchronization directories may be updated by inserting the translate attribute in the string elements that are new or changed. The resource strings flagged in the synchronization directory are then translated and validated. Since only new and changed resource strings are translated, the localization cost is reduced. The resource files containing the localized resource strings are then generated. A target directory (60) contains the generated output in a format required by the product.

Therefore, the source directory (54), the reference directory (56) and the synchronization directory (58) keep track of changes made to the resource strings in different releases of the computer program product and identifies the resource strings that are new or changed.

Therefore, the present invention separates the localization of a computer software product from the development of the computer software product, which enables the computer software product to be localized by a third party rather than the software manufacturer after the computer software product is released. The computer software product supplies its specifications and requirements as part of the input to the components. Compilation/generation of runtime files can be done for released software, runtime files may be placed into the directory required by the software product.

Re-using the previous translation when localizing the subsequent release of the same computer software product in the present invention significantly reduces the cost of translation.

The components of the present invention, which performs synchronization, validation, and generation, is product neutral and platform independent (both software and hardware). The components of the present invention that perform synchronization, validation, and generation is software and hardware platform independent, and can be used on any OS platform. The present invention validates the translated files before generating runtime files to ensure the integrity of the files before generating runtime files.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

EXAMPLES

Example 1

User Input

Stored in the configuration file(LocalizationConfig.properties)
Source_Directory =C:/Program Files/cognos/crn/msgsdk
Source_Locale =en
Synchronization_Directory =C:/Translation/Sync
Reference Directory =C:/Translation/Sync/Ref
Sandbox_Directory =C:/Translation/Sandbox
Target_Directory =C:/Translation/Target
Target Locale_List =ja, de, fr
Package_File =C:/Translation/LocalizationOut.zip
Log_File =C:/Translation/Localization.log
Component_Name_List =All
VAR_Information =Generated by Cognos Example 2

Every component may have the following structure for string resources:
res/XXX_en.xml—this is the English string resource file
res/translations/XXX_LL_base.xml—a copy of the English resource file that has been translated to LL
res/translations/XXX_LL_trans.xml—the translated version of XXX_LL_base.xml
where: XXX is the name of the component
LL is the locale code (e.g. fr for French)

There will be a utility (sync trans.js) provided that will generate a version of the localized string resources (res/XXX_LL.xml) that is in sync with res/XXX_en.xml. It will take the file translations/XXX_LL_trans.xml and create a new file XXX_LL.xml as follows:

Insert strings from XXX_en.xml that are not represented in XXX_LL_base.xml. They will have the 'translate' attribute of the string set to 'new'.

Insert strings from XXX_en.xml that are different from those in XXX_LL_base.xml. They will have the 'translate' attribute of the string set to 'changed'.

Insert strings from XXX_LL_trans.xml that have not changed from XXX_en.xml to XXX_LL_base.xml.

Example 3

In order to do a translation, the localization team will need to do the following:

Take a copy of XXX_en.xml and XXX_LL.xml (after running the sync utility) and rename them to XXX_LL_base.xml and XXX_LL_trans.xml respectively.

Send both these files out as a package to be translated. Localize the strings whose 'translate' attribute is set to 'new' or 'changed' (they will be in English) found in XXX_LL_trans.xml. Don't change XXX_LL_base.xml.

When the translation is complete then checkout from perforce translations/XXX_LL_base.xml and translations/XXX_LL_trans.xml and replace them with the completed files.

Run the sync utility to generate XXX_LL_.xml. Note that you may end up with English strings in it since the English resources may have changed while the translation work was being done.

Example 4

At some point just before we finally release, is may be advantageous to lock down XXX_en.xml so that a final translation can be done.

Example 5

Base language string resources may be treated by the documentation group as essentially a translation from "developer English" to "proper English", with a minor twist in that the output of this synchronization would be the XXX_en.xml. So, in addition the structure required could have these additions:
res/review/xxx_en_base.xml
res/review/xxx_en_trans.xml

Example 6

In order to review a resource string file, the following would be needed:

Run the sync utility over the review files to create a new version of XXX_en.xml. The 'translate' attribute of the strings that require review will now be set to 'new' or 'changed'.

Copy XXX_en.xml over review xx_en_base.xml and xx_en_trans.xml.

The reviewers will change the strings marked as 'new' or 'change' in XXX_en_trans.xml. Don't change XXX_en_base.xml.

Run the sync utility to generate a new version of XXX_en.xml. I think Development should control this last step; the reviewers should simply notify Development after they've checked in the files they've changed.

Example 7

Synchronizing message files in the Report Server (Warp):
The following are the message files for Warp.
//warp/Baltic/main/Warp/Messages/CATDialogStrings_{de,fr,ja}.xml
//warp/Baltic/main/Warp/Messages/ClientPromptStrings_{de,fr,ja}.xml
//warp/Baltic/main/Warp/Messages/rsvmsgs_{de,fr,ja}.xml 2. In Perforce, check out the respective {de,fr,ja}.xmliles for the English file you have modified. Also, use p4 sync or equivalent in p4win to get the latest versions of the files in Messages/translations/ . . .

NOTE: //warp/Baltic/main/Warp/Messages/cgiMsg{de,fr,ja}.txt is not in for example, XML format and therefore cannot be synchronized with the automated synchronization tool. Any changes to this message file must be synchronized by hand. This should not prove to be a big problem, as this message file is quite small and likely to be very stable.

3. Open a command window in the src/Warp/Builds directory.
4. Run the syncTrans.bat command.
5. Delete the following files:
win32/obj[d]/Warp/Messages/*.obj
win32/obj[d]/Warp/Messages/*.c
win32/obj[d]/Warp/Messages/*.xpf
win32/obj[d]/Warp/Message/*.obj
win32/bin[d]/rsvmsgs_de.*
win32/bin[d]/rsvmsgs_en.*
win32/bin[d]/rsvmsgs_fr.*
win32/bin[d]/rsvmsgs_ja.*
6. Run the installWarp.sh command.
7. Test. (You can change your language selection by going in your browser's internet options, click on the Languages button and add French, German or Japanese at the top of your list.)

Example 8

Synchronizing message files in CCL:
1. The following are the message files for CCL.
//ccl/Baltic/main/CCL/Messages/cclbitmsgs_{de,fr,ja}.xml
//ccl/Baltic/main/CCL/Messages/cclcmimsgs_{de,fr,ja}.xml
2In Perforce, check out the respective {de,fr,ja}.xml files for the English file you have modified. Also, use p4sync or equivalent in p4to get the latest versions of the files in Messages/translations/ . . .
3. Open a command window in the src/CCL/Builds directory.
4. Run the syncTrans.bat command.
5. Delete the following files:
win32/obj[d]/CCL/Messages/*.obj
win32/obj[d]/ CCL /Messages/*.c
win32/obj[d]/ CCL /Messages/*.xpf
win32/obj[d]/ CCL /Messages/*.obj

Example 9

Test

IV, Synchronizing the Message files from Localization Team
When the localization team performs the translations for the German, French and Japanese message files, we need to do the synchronization again. Usually, they indicate through email when the files are updated. To synchronize:
1. In perforce, check out the following files for Warp:
//warp/Baltic/main/Warp/Messages/CATDialogStrings {de,fr,ja}.xml
//warp/Baltic/main/Warp/Messages/ClientPromptStrings {de,fr,ja}.xml
//warp/Baltic/main/Warp/Messages/rsvmsgs_{de,fr,ja}.xml
2. Check out the following files for CCL:
//ccl/Baltic/main/CCL/Messages/cclbitmsgs_{de,fr,ja}.xml
//ccl/Baltic/main/CCL/Messages/cclcmimsgs_{de,fr,ja}.xml Also, use p4 sync or equivalent in p4win to get the latest versions of the files in Messages/translations/ . . .

3. Repeat the same procedure starting from step 3 as above.

Example 10

The text strings that localized are located in the, for example, XML resource files in a product's install location message file directory. A schema file, such as that named CCLMessageFile.xsd, also located in the same directory, defines the structure of the resource files. Examples of files to localize and their descriptions can be seen in Table 5 below.

Example 11

The localization process may have to be performed for each release of the product. The. system keeps track of changes made to the text strings in different releases of the product and identifies the strings that are new or changed.

Example 12

Saving Cost

For the next release, you can easily find and localize only those strings. This helps to reduce your localization costs.

Example 13

The user configures the system before they start using it to localize text. Configuration involves specifying directories where the, for example, XML resource files can be obtained, processed, and placed after they are localized. It also involves specifying locale codes that define the source and target languages.

The user specifies configuration variables in a configuration properties file such as the LocalizationConfig.properties file located in the product installation directory named ldk_location\bin.

When you specify locale variables, such as Source Locale and Target Locale List, ensure that the locale string always contains a valid International Organization for Standardization (ISO) language code. It can also contain an optional ISO country code. The ISO language code is a lowercase, two-letter code defined by ISO-639. The ISO country code is a lowercase two-letter code defined by ISO-3166. For example, ja (Japanese), it (Italian), ru (Russian), zh-cn (Simplified Chinese (China)), and zh-tw (Traditional Chinese (Taiwan)).

Example 14

Configuration Variables

| Variable | Value |
|---|---|
| Source_Directory | Location of the directory that will contain copies of the original resource files, such as C:/Translation/Src. |
| Source_Locale | Language code of the original resource files from which the text is localized such as en; fr; de; ja; with a default of en |
| Synchronization_Directory | Location of the directory that will contain the resource files that the user translates or modifies, such as C:/Translation/Sync. |

-continued

| Variable | Value |
|---|---|
| Reference_Directory | Location of the directory that will contain unchanged copies of the original resource files used in a given localization project. In a subsequent localization project, these files are used to determine which text was added, deleted, or updated. The user can create this directory as a subdirectory of the synchronization directory, such as C:/Translation/Sync/Ref. |
| Sandbox_Directory | Location of the directory that will act a temporary workspace for the system, such as C:/Translation/Sandbox. |
| Target_Directory | Location of the directory that will contain the target resource files, such as C:/Translation/Target. |
| Target_Locale_List | One or more language codes, separated by a comma, into which the text will be translated, such as it, ru, pl, es, pt, and zh-cn. |
| Package_File | Name and location of the compressed file (.zip) that will contain the packaged target resource files, such as C:/Translation/LocalizationOut.zip. |
| Log_File | Name and location of the log file that will contain processing information, such as C:/Translation/Localization.log. Default: No log file |
| Component_Name_List | Names of the product components, separated by a comma, that represent the component element in the input resource files for which the messages are localized. Default: All |
| VAR_Information | Text that VARs can embed in the localized files, such as "Generated by company X". |

The user will need to have write permissions for the following subset of directories and files:

Synchronization_Directory
Reference_Directory
Sandbox_Directory
Target_Directory
Package_File
Log_File Example 15

After configuring the system, the user can then localize message and user interface text. You can see the processing results in a log file created in the location that was specified for the Log_File variable during the configuration above.

the system keeps track of the localized messages and user interface text in different versions of files used in previous localization projects. When the user localizes the next version of the product, only and changed strings.

After localization is complete, the files are kept in the synchronization directory and in the reference directory for subsequent localization projects.

To localize a software product and prepare the localized version for use:

Set up the source directory.
Prepare the input resource files for localization.
Localize the text.
Validate the resource files.
Generate the target resource files.
Copy the target resource files to the product installation directory.

Example 16

ReportNet

The following steps are required for localizing ReportNet:
Copy ReportNet documentation files.
Copy ReportNet database function files to the product directories.
Configure the product to work with localized resource files.

Example 17

Set up the Source Directory

Before the user can run the system, they first set up the source directory and copy all the input resource files from the product's install location message file directory and subdirectories to the source directory by creating a source directory using the name specified for the Source_Directory variable during configuration, and copying all the files and sub-directories located in the product installation message file directory to the new source directory.

The user can now prepare the files for localization.

Example 18

Prepare the Input Resource Files for Localization

Before you can start localizing text, One embodiment of the present invention must create and synchronize the directories it will use for processing. When you localize the text for the first time, One embodiment of the present invention processes the input resource files as follows:

The synchronization directory and the reference directory are automatically created in the location you specified during configuration for the Synchronization_Directory and Reference_Directory variables.

Resource files are automatically copied from the source directory to both the synchronization directory and the reference directory. The file names in both directories include the target locale strings. For example,if you specified fr, es, and it as your Target Locale variables during configuration, the file names will contain these locale strings.

Resource files in the reference directory are automatically renamed to include the REF suffix in their name. For example, a file named CAM_AAA_es.xml becomes CAM_AAA_es_REF.xml.

A translate attribute is added to the string elements in your resource files in the synchronization directory. The value of this attribute is set to new (p. 30).

For subsequent localization projects, the value of this attribute is set to new or changed.

Steps for Windows
1. From the Start menu, click Programs.
2. Click Synchronize.
The application runs the localize sync.bat file located in the Localization Development Kit installation directory named ldk location/bin.
The processing may take a few minutes. After it is finished, you can localize the text.

Steps for UNIX
Ensure that you have an environment variable named JAVA_HOME that points to the location of your Java Runtime Environment.

Tip: An example of the installation location of a Java Runtime Environment is java_directory/java/java version/jre
1. Open a command prompt window.
2. Find the location where One embodiment of the present invention is installed.
3. Type
//ldk_location/bin>localize.sh sync
The processing may take a few minutes. After it is finished, you can localize the text.

Example 19

Localize the Text

Translate or otherwise modify the messages and user interface text in the files that are located in the synchronization directory. Modify the strings that contain the translate attribute (translate="new" or translate="changed").You should be familiar with the structure of the input resource files.

You must already have prepared the resource files for localization.

After you finish editing your strings, you must delete the translate attributes. We recommend that you delete them manually after you modify each string.

You can delete the translate attributes globally when:
you are certain that all your strings are localized. If you delete all your translate attributes before you finish localizing all the strings, you may have problems finding the strings that were not localized.
you want to localize only specific strings and do not want to localize the remaining strings marked with the translate attribute. If you customize the product, you may want to modify only certain strings. You find and modify the strings, review your changes, and then delete all the translate attributes globally to proceed with the remaining steps. The synchronization directory is your translation directory. The files in this directory contain the text to be localized. Use a file with the proper locale string to make your changes. For example, the synchronization directory contains files named CAM_AAA_es.xml and CAM_AAA_it.xml.

Use the CAM_AAA_es.xml file to translate the text to Spanish, and use the CAM_AAA_it.xml file to modify the text in Italian.

The files in the reference directory are used as a reference for subsequent localization projects, and you must not edit them. For example, the synchronization directory contains a file named CAM_AAA_fr.xml, and the reference directory contains a file named CAM_AAA_fr_REF.xml. To localize the text, use the CAM_AAA_fr.xml file in the synchronization directory.

Ensure that you back up the files in your synchronization and reference directories for subsequent localization projects.

You may want to retranslate or customize the files translated. To save time, you can reuse the existing, translated versions of files. To do that, specify the same source and target locales during configuration. For example, to retranslate the French version, specify fr for both the source locale and the target locale.

An alternative method is to specify different source and target locales. For example, to retranslate the French version, specify en for the source locale and fr for the target locale.

Perform the steps in this topic, and then manually copy the French version of the files to the synchronization directory.

The English version generated by One embodiment of the present invention is overwritten. Then, proceed with the remaining tasks in this guide.

Important: To edit, for example, XML resource files we strongly recommend that you use an editor. When editing XML files, which are Unicode files it is important to preserve the Unicode encoding and format, including white space. Simple text editors will likely corrupt the files. A validating XML editor ensures that the contents of the files are well formed and valid. When you use an XML editor you can view online schema documentation that explains the contents of the files. Only modify string information. Do not change other information in the files, Steps
1. In an XML editor, o$_R$en a file in the synchronization directory.

You can determine if a file contains a new or changed string by viewing the log file created in the location that you specified for the Log_File variable during configuration (p. 15)
2. Localize the strings that are identified by the translate attributes as new or changed.
Important: Do not modify any text other than the strings.
3. If you want to delete the translate attributes manually, delete them now.
4. Ensure that all strings in the file are localized.
Tip: Search for new and changed.
5. Save the file.
6. Repeat steps 1 to 5 for each file in the synchronization directory that has new or changed strings.
7. If you want to delete the translate attributes globally, do one of the following:

Validate the Resource Files

Before you generate the target resource files, it is important to validate the localized files in the synchronization directory. The validation process
checks to see if the localized files conform to the schema CCLMessageFile.xsd.
This is to ensure that no changes were made to the format of the input files.
checks for the presence of the translate attribute in the localized files.
If the translate attribute present, a warning appears.
You must have already localized the files.

Steps for UNIX
1. Open a command Prompt window.
2. Find the location where Localization Development Kit is installed.
3. Type
//ldk_location/bin>localize.sh validate
The processing may take a few minutes.
4. If a warning appears about a translate attribute:
Open the file that contains the translate attribute.
Ensure that all messages are localized.
Ensure that all translate attributes are deleted.
5. Repeat steps 1 to 4 until the validation is successful.
You can now generate the target resource files.

Steps for Windows
1. From the Start menu, click Programs, Cognos Localization Development Kit, and then click Validate.
The application runs the localize validate.bat file located in the Cognos Localization Development Kit installation directory named ldk_location\bin.
The processing may take a few minutes.
2. If a warning appears about a translate attribute:
Open the file that contains the translate attribute.
Ensure that all messages are localized.
Ensure that all translate attributes are deleted.
3. Repeat steps 1 to 3 until the validation is successful.
You can now generate the target resource files Example 22

Generate the Target Resource Files

One embodiment of the present invention generates the target resource files containing the localized text. The target directory is automatically created in the location you specified for the Target Directory variable, if the validation process fails, the target directory is not created. The structure of the target directory is identical to the structure of the product installation directory, such as the crn directory in ReportNet.

The target resource files are generated in a format that can be used by the product. They are also automatically compressed using the ZIP utility. The package_File variable specifies the name and location of the compressed file (.zip). When you later copy the target resource files, you can also use your own packaging utility to compress the files.

You must have already validated the files.

Steps for UNIX
1. Open a command prompt window.
2. Find the location where One embodiment of the present inventionis installed.
3. Type
//ldk location/bin>localize.sh generate
The processing may take a few minutes. After it is finished, you can copy the target resource files to the product installation directory.

Steps for Windows
1. From the Start menu, click Programs, Cognos Localization Development Kit.
2. Click Generate.
The application runs the localize_generate bat file located in the One embodiment of the present invention installation directory named ldk location\bin.
The processing may take a few minutes. After it is finished, you can copy the target resource files to the product installation directory.

Copy the Target Resource Files to the Product installation Directory

After the target resource files are generated in the target directory, you must copy them to the product installation directory, such as the crn directory in ReportNet.

Steps
1. Open the target directory.
The target directory is the location specified for the Target_Directory variable during configuration.
2. Copy all the files and directories from the target directory to the product installation directory by using one of the following methods:
Unzip the compressed file (.zip) in the product installation directory. The zip file name is specified for the Package File variable during configuration.
Copy all the files and directories from the target directory, except for the compressed file (.zip), to the product installation directory.

Example 23

Localizing Subsequent Versions of a Product

If a new version or a patch for a product contains changes to the messages or user interface text, you must localize the resource files again, the present invention simplifies this task. It can check if the new version of files in the source directory differs from the previous version saved in the reference directory. It then updates the files in the reference and synchronization directories by inserting the translate attribute in the string elements that are new or changed in the files in the synchronization directory. Because you localize only new and changed strings, the localization cost is reduced.

To process a subsequent localization project:
☐ Important: Back up all files in the synchronization and reference directories before you begin.

Configure One embodiment of the present invention to update the configuration settings, if required (p. 15).

Set up the source directory, and then copy new versions of the input resource files located in the product installation directory named msgsdk in the source directory (p. 29).

You can use the source directory from the previous localization project, or set up a new source directory. However, we recommend that you set up a new source directory.

Ensure that the files from the previous localization project are in the synchronization and reference directories (p. 20).

Prepare the input resource files for localization (p. 20). Files in the synchronization directory and the reference directory are automatically updated. If the current version of an input resource file differs from the previous version, a translate attribute that has a value of new or changed is inserted into the appropriate string elements.

Localize strings identified by the translate attribute (p. 20).

Validate the resource files (p. 22).

Generate the target resource files (p. 23).

Copy the target resource files to the product installation directory (p. 23).

Example 24

Input Resource Files

Input resource files are for example XML files that contain message strings, such as error messages and warnings, as well as menu text and user interface text. Strings can be localized for different language versions of a product or modified for the same language versions.

The input resource files located in a directory named msgsdk in the product installation directory. They conform to the rules specified in the schema file named CCLMessageFile.xsd, located in the same directory. The schema defines the elements and attributes that are used by the resource files.

We recommend that you familiarize yourself with the structure of the input resource files before you start localizing the messages and user interface text.

The files contain the following elements: string Table, component, section, string, and param.

Some of the attributes that affect the localization process are: error Code, translate, and usage.

Important: To edit, FOR EXAMPLE, XML resource files we strongly recommend that you use an XML editor. When editing XML files, which are Unicode files, it is important to preserve the Unicode encoding and format including white space. Simple text editors will likely corrupt the files. A validating XML editor ensures that the contents of the files are well formed and valid. When you use an XML editor, you can view online schema documentation that explains the contents of the files. Only modify string iformation. Do not change other information in the files.

Example 26

UI-The Strings in this Section Represent User Interface Text

| Type | Description |
| --- | --- |
| Button | Text inside a command button. |
| Check Box | Label describing a control that turns a setting on or off. The setting of an individual check box is independent of other check boxes. |
| Control Label | Text that describes the purpose of specific controls, such as a list box or a text box. |
| Dialog Caption | Text that is a title or that introduces a dialog box, a message box, or a property sheet. |
| Group Box Label | Label for a rectangular box, which surrounds a set of similar or related controls. |
| Link | Text of medium length that describes a URL. |
| List Item Label | Label for a standard list box, which is used to choose a single item or a range of items from the list. |
| Pane Header | Caption at the top of a pane. |
| Property_Group | Label that describes a property group. |
| Property Name | Label that describes a property for which the user can select or type a value. |
| Radio Button | Label that describes a radio button. The radio button appears in a group of buttons. Only one of them may be selected at a time. When you select one radio button, the others are automatically cleared. Clicking the radio button never initiates an action. |
| Status Bar | A form of contextual help that provides status information to the user. |
| String | Introductory text and other read-only text in dialog boxes. This is the default option. |
| Tab Label | Short text introducing the controls that belong to the tab. |
| Tooltip | A form of short, contextual help that appears when the user pauses the pointer over a control. |

Example 28

Menus-The Strings in this Section Represent User Interface Text Associated with Menus

| Type | Description |
| --- | --- |
| Menu | Main label for a drop-down menu, which is a collection of menu items or choices. |
| Menu Item | Any of the subdivisions of a menu. |
| Tooltip | A form of short, contextual help that appears when the user pauses the pointer over a control. |
| Status Bar | A form of a contextual help that provides status information to the user. |

Param Element

An element that provides a placeholder in a string of text for a parameter. The input for the parameter is generated by the application and depends on the context in which a message appears.

In each string element, zero or more param elements can occur.

The type attribute for the param element indicates the type of data this element substitutes. The types of data that can be substituted by the param clement are:

currency
full Date
full Time
integer
long Date
long Time
medium Date
medium Time
percent
short Date
short Time
string (default)

By knowing the type of the param element, translators can apply different grammatical style and wording to the text surrounding this element.

The position of the param element in the string may change when the text is translated into other languages. Translators must pay special attention when they embed the param element in the translated text, Example 30

ErrorCode Attribute

An errorCode attribute is an attribute that appears only with string elements in the Messages section. It identifies error messages.

Example 31

Translate Attribute

An attribute that identifies strings that must be translated or otherwise modified. Only files in the Synchronization directory contain strings with this attribute. One embodiment of the present invention sets it automatically.

The values for this attribute are:
New-Identify all strings for the first localization project, and all new strings added after each subsequent localization project.
Changed-Identifies strings changed after the last localization project.

Example 32

Usage Attribute

A comment that describes any exceptional conditions that can affect the localization of a string. Do not modify the text_ associated with this attribute.

Example 33

Files to Localize in

Following, is a list of files in ReportNet® version 1.1 MR1 that you must localize and their descriptions. Localizing these files ensures that all messages and strings appear in a localized language. The XX in each file name is replaced by the lower-case language code of the target language.

| File | Description |
|---|---|
| bapimsgs_XX.xml | BAPI interface messages |
| bmemsgs_XX.xml | Framework Manager error messages |

-continued

| File | Description |
|---|---|
| CAM_AAA_XX.xml | Authentication and Authorization services messages |
| CAM_Crypto_XX.xml | Cryptography services messages |
| cclbitmsgs_XX.xml | Messages related to communication between dispatcher and report server |
| cclcfgapimsgs_XX.xml | Messages related to configuration API |
| cclil8nrescr_XX.xml | Messages for currencies in I18n toolkit |
| cclil8nreslc_XX.xml | Messages for locales in I18n toolkit |
| cclil8nrestz_XX.xml | Messages for time zones in I18n toolkit |
| cclil8nreswd_XX.xml | Messages for UI words in I18n toolkit |
| cclibimsgs_XX.xml | Messages related to "IBJStreams" objects |
| cclpluginmsgs_XX.xml | Messages related to "CCLPlugin" objects |
| cclrcimsgs_XX.xml | Messages related to RCI objects |
| cclurlmsgs_XX.xml | URL error messages from Content Manager |
| cmmsgs_XX.xml | Messages from Content Manager, including error messages |
| cgiMsg_XX.xml | Gateway error messages |

What is claimed is:

1. A method for localization of a released computer program comprising:
    receiving, by a computer, a resource file for the released computer program that includes a first set of text strings in a base language that are used to display one or more text message on a graphical user interface during execution of the released computer program;
    receiving, by the computer, processing instructions that define a process for transforming the first set of text strings of the resource file into a first runtime resource file for the released computer program;
    receiving, by the computer, a second set of text strings in a target language, wherein the second set of text strings is platform-independent and comprises translations of the first set of text strings in the target language, wherein the second set of text strings corresponds to a valid International Organization for Standardization (ISO) language code and ISO country code that indicates the target language;
    determining, by the computer, changes made to at least one of the first set of text strings in the resource file after receiving the second set of text strings;
    translating, by the computer, the at least one text string into the target language;
    producing, by the computer, a second runtime resource file for the released computer program comprising the second set of text strings according to the received processing instructions that were used for transforming the first set of text strings of the resource file into the first runtime resource file for the released computer program; and
    executing, by the computer, the released computer program, wherein executing comprises loading the first runtime resource file and the second runtime resource file, receiving a language selection comprising a selection of either the base language or the target language, and displaying a text string from either the first set of text strings or the second set of text strings according to the received language selection.

2. The method of claim 1, wherein the target language comprises a different language than the base language.

3. The method of claim 1, further comprising:
    receiving, by the computer, an update to the first set of text strings, wherein the update includes an updated text string in the base language;
    receiving, by the computer, a translation of the updated text string in the target language;

updating, by the computer, the second runtime resource file to include the translation of the updated text string according to the processing instructions; and wherein executing the released computer program further comprises displaying the updated text string in either the base language or the target language according to the received language selection.

4. The method of claim 3, wherein receiving an update comprises receiving a new text string.

5. The method of claim 3, wherein receiving an update comprises receiving a modification to at least one of the first set of text strings.

6. The method of claim 1, further comprising receiving, by the computer, an update to the first set of text strings, wherein the update includes an updated text string, wherein the second set of text strings in the target language comprises a translation of the updated text string in the target language.

7. The method of claim 1, further comprising:

receiving, by the computer, a third set of text strings in a second target language, wherein the third set of text strings comprises translations of the first set of text strings in the second target language, the second target language being different from the target language and the base language; and producing, by the computer, a third runtime resource file for the released computer program comprising the third set of text strings according to the processing instructions.

8. The method of claim 1, further comprising copying, by the computer, the second runtime resource file to an installation directory of the released computer program.

9. A computer-readable storage medium comprising instructions for causing a programmable processor to:

receive a resource file for a released computer program that includes a first set of text strings in a base language that are used to display one or more text message on a graphical user interface during execution of the released computer program;

receive processing instructions that define a process for transforming the first set of text strings of the resource file into a first runtime resource file for the released computer program;

receive a second set of text strings in a target language, wherein the second set of text strings is platform-independent and comprises translations of the first set of text strings in the target language, wherein the second set of text strings corresponds to a valid International Organization for Standardization (ISO) language code and ISO country code that indicates the target language;

determine changes made to at least one of the first set of text strings in the resource file after receiving the second set of text strings;

translate the at least one text string into the target language;

produce a second runtime resource file for the released computer program comprising the second set of text strings according to the received processing instructions that were used for transforming the first set of text strings of the resource file into the first runtime resource file for the released computer program; and execute the released computer program, wherein the instructions to execute the released computer program comprise instructions to load the first runtime resource file and the second runtime resource file, receive a language selection comprising a selection of either the base language or the target language, and display a text string from either the first set of text strings or the second set of text strings according to the received language selection.

10. The computer-readable medium of claim 9, further comprising instructions to:

receive an update to the first set of text strings, wherein the update includes an updated text string in the base language;

receive a translation of only the updated text string in the target language;

update the second runtime resource file to include the translation of the updated text string according to the processing instructions; and wherein the instructions to execute the released computer program further comprise instructions to display the updated text string in either the base language or the target language according to the received language selection.

11. The computer-readable medium of claim 10, wherein the instructions to receive an update comprise instructions to receive a new text string.

12. The computer-readable medium of claim 10, wherein the instructions to receive an update comprise instructions to receive a modification to at least one of the first set of text strings.

13. The computer-readable medium of claim 9, further comprising instructions to receive an update to the first set of text strings, wherein the update includes an updated text string, wherein the second set of text strings in the target language comprises translations of the first set of text strings and the updated text string in the target language.

14. The computer-readable medium of claim 9, further comprising instructions to:

receive a third set of text strings in a second target language, wherein the third set of text strings comprises translations of the first set of text strings in the second target language, the second target language being different from the target language and the base language; and produce a third runtime resource file for the released computer program comprising the third set of text strings according to the processing instructions.

15. The computer-readable medium of claim 9, further comprising instructions to copy the second runtime resource file to an installation directory of the released computer program.

* * * * *